(12) United States Patent
Holmes et al.

(10) Patent No.: US 9,769,035 B2
(45) Date of Patent: *Sep. 19, 2017

(54) DOMAIN POPULARITY SCORING

(71) Applicant: VERISIGN, INC., Reston, VA (US)

(72) Inventors: Alexander D. Holmes, Sterling, VA (US); Andrew W. Simpson, Sterling, VA (US); Karthik Shyamsunder, Winchester, VA (US); Srinivas Sunkara, Ashburn, VA (US); Eyal Lanxner, Modiin (IL); Nir Zohar, Netanya (IL); Leonard Orentas, South Riding, VA (US); Matt Larson, Reston, VA (US); Mark Kosters, Clifton, VA (US); Shevek Mankin, Cupertino, CA (US); Tamir Kamara, Yamin (IL)

(73) Assignee: VERISIGN, INC., Reston, VA (US)

( * ) Notice: Subject to any disclaimer, the term of this patent is extended or adjusted under 35 U.S.C. 154(b) by 251 days.

This patent is subject to a terminal disclaimer.

(21) Appl. No.: 14/561,438

(22) Filed: Dec. 5, 2014

(65) Prior Publication Data

US 2015/0089056 A1 Mar. 26, 2015

Related U.S. Application Data

(63) Continuation of application No. 12/755,049, filed on Apr. 6, 2010, now Pat. No. 8,909,760.
(Continued)

(51) Int. Cl.
*G06F 15/173* (2006.01)
*G06F 15/16* (2006.01)
(Continued)

(52) U.S. Cl.
CPC ............ *H04L 43/04* (2013.01); *G06Q 30/00* (2013.01); *G06Q 30/0273* (2013.01);
(Continued)

(58) Field of Classification Search
CPC ..... H04L 51/28; H04L 51/30; H04L 29/1215; H04L 61/1564; H04L 12/58
(Continued)

(56) References Cited

U.S. PATENT DOCUMENTS 6,205,477 B1 3/2001 Johnson et al.
6,233,575 B1 5/2001 Agrawal et al.
(Continued)

FOREIGN PATENT DOCUMENTS

CA 2757834 A1 10/2010
CN 1945565 4/2007
(Continued)

OTHER PUBLICATIONS

Non-Final Office Action dated Oct. 7, 2015, U.S. Appl. No. 13/973,972, pp. 1-42.
(Continued)

*Primary Examiner* — Farzana Huq
(74) *Attorney, Agent, or Firm* — MH2 Technology Law Group, LLP

(57) ABSTRACT

Systems and methods for scoring a domain including analyzing counter data and information obtained from a web site associated with the domain. Methods may include receiving requests to resolve the domain at an authoritative domain resolution server. A counter may be incremented for the domain based on the received requests. Information may be obtained from a web page associated with the domain. For example, obtaining information from the web page may include obtaining quantitative, qualitative, and/or functional information from the web page, such as link information, a status of network links corresponding to the link information, and associated ratios. The status of link information may include searching for functional details and/or results, such as, domain redirections, domain errors, mirror content, (Continued)

and commonly linked sites. A score may be calculated for the domain based upon the counter data and the information obtained from the web page associated with the domain.

20 Claims, 10 Drawing Sheets

Related U.S. Application Data

(60) Provisional application No. 61/167,521, filed on Apr. 7, 2009, provisional application No. 61/167,523, filed on Apr. 7, 2009, provisional application No. 61/167,528, filed on Apr. 7, 2009.

(51) Int. Cl.
*H04L 12/26* (2006.01)
*G06Q 30/00* (2012.01)
*G06Q 30/02* (2012.01)
*H04L 29/12* (2006.01)

(52) U.S. Cl.
CPC ..... *G06Q 30/0277* (2013.01); *G06Q 30/0282* (2013.01); *H04L 29/12066* (2013.01); *H04L 43/062* (2013.01); *H04L 61/1511* (2013.01)

(58) Field of Classification Search
USPC .............. 709/206–207, 224, 225, 245, 246
See application file for complete search history.

(56) References Cited

U.S. PATENT DOCUMENTS

| | | | |
|---|---|---|---|
| 7,165,069 B1 | 1/2007 | Kahle et al. | |
| 7,260,834 B1 | 8/2007 | Carlson | |
| 7,260,837 B2 | 8/2007 | Abraham et al. | |
| 7,472,201 B1 | 12/2008 | Aitken | |
| 7,657,629 B1 | 2/2010 | Kommula | |
| 7,849,142 B2 | 12/2010 | Clegg et al. | |
| 7,849,507 B1 | 12/2010 | Bloch et al. | |
| 2002/0032772 A1 | 3/2002 | Oldtad et al. | |
| 2003/0115280 A1* | 6/2003 | Quine ................ | H04L 29/1215 709/207 |
| 2003/0130982 A1 | 7/2003 | Kasriel et al. | |
| 2004/0073707 A1 | 4/2004 | Dillon | |
| 2004/0111438 A1 | 6/2004 | Chitrapura et al. | |
| 2004/0128285 A1 | 7/2004 | Green et al. | |
| 2004/0190448 A1 | 9/2004 | Fishteyn et al. | |
| 2005/0076222 A1 | 4/2005 | Olkin et al. | |
| 2005/0223093 A1 | 10/2005 | Hanson et al. | |
| 2006/0010215 A1* | 1/2006 | Clegg ................ | G06Q 10/107 709/206 |
| 2006/0112176 A1 | 5/2006 | Liu et al. | |
| 2006/0212931 A1 | 9/2006 | Shull et al. | |
| 2006/0282883 A1 | 12/2006 | Rosenberg et al. | |
| 2007/0033275 A1 | 2/2007 | Toivonen et al. | |
| 2007/0073758 A1 | 3/2007 | Perry et al. | |
| 2007/0130316 A1 | 6/2007 | Turakhia | |
| 2007/0162349 A1 | 7/2007 | Silver | |
| 2007/0192190 A1 | 8/2007 | Granville | |
| 2008/0022013 A1 | 1/2008 | Adelman et al. | |
| 2008/0028443 A1 | 1/2008 | Adelman et al. | |
| 2008/0082662 A1* | 4/2008 | Dandliker ............ | H04L 63/10 709/225 |
| 2008/0086741 A1 | 4/2008 | Feldman et al. | |
| 2008/0091524 A1 | 4/2008 | Yan et al. | |
| 2008/0133500 A1 | 6/2008 | Edwards et al. | |
| 2008/0163369 A1 | 7/2008 | Chang et al. | |
| 2008/0177994 A1 | 7/2008 | Mayer | |
| 2008/0189408 A1 | 8/2008 | Cancel et al. | |
| 2008/0228928 A1 | 9/2008 | Donelli et al. | |
| 2008/0281676 A1 | 11/2008 | Stahura et al. | |
| 2009/0049524 A1 | 2/2009 | Farrell et al. | |
| 2009/0070453 A1 | 3/2009 | Douglis et al. | |
| 2009/0132524 A1 | 5/2009 | Stouffer et al. | |
| 2009/0150539 A1* | 6/2009 | Epling ................... | G06Q 30/02 709/224 |
| 2009/0254545 A1 | 10/2009 | Fisken | |
| 2010/0257024 A1 | 10/2010 | Holmes et al. | |
| 2010/0257266 A1 | 10/2010 | Holmes et al. | |
| 2010/0299317 A1 | 11/2010 | Uy | |
| 2011/0087769 A1 | 4/2011 | Holmes et al. | |

FOREIGN PATENT DOCUMENTS

| | | |
|---|---|---|
| CN | 1945567 | 4/2007 |
| CN | 101371238 A | 2/2009 |
| CN | 101729288 | 6/2010 |
| EP | 2592814 A1 | 5/2013 |
| KR | 10-2007-0119813 | 12/2007 |
| WO | 2008/049093 | 4/2008 |
| WO | 2010/118118 A1 | 10/2010 |

OTHER PUBLICATIONS

First Office Action dated Oct. 30, 2015, Korean Application No. 10-2011-7026092, pp. 1-12 (Includes English Translation).
Extended European Search Report dated Jan. 21, 2016, European Application No. 15182060.2, pp. 1-11.
Leyla Bilge et al., "Exposure: A Passive DNS Analysis Service to Detect and Report Malicious Domains", ACM Transactions on Information and System Security, vol. 16, No. 4, Article 14, Apr. 2014, pp. 1-28.
Anonymous, "DNS analytics", from Wikipedia, the free encyclopedia, Retrieved from the internet: https://en.wikipedia.org/w/index.php?title=DNS_analytics&oldid=616730284, Jul. 2014, pp. 1-2.
Canadian Office Action dated Jun. 8, 2016, Canadian Patent Application No. 2,757,834, pp. 1-5.
Canadian Office Action dated Jun. 15, 2015, Canadian Application No. 2,757,832, pp. 1-8.
Author Unknown, "Notice from the European Patent Office dated Oct. 1, 2007 concerning business methods", Official Journal of the European Patent Office, vol. 30, No. 11, Nov. 2007, pp. 592-593.
Extended European Search Report dated Jun. 5, 2014, European Application No. 10762360.5, filed Apr. 7, 2010, pp. 1-7.
Extended European Search Report dated Jun. 5, 2014, European Application No. 10762355.5, filed Apr. 7, 2010, pp. 1-7.
First Office Action dated Dec. 4, 2013, Chinese Patent Application No. 201080024730.5, filed Apr. 7, 2010, pp. 1-27 with English Translation.
Patent Examination Report No. 1 dated Apr. 4, 2014, Australian Patent Application No. 2010234484, filed Apr. 7, 2010, pp. 1-4.
First Office Action dated Sep. 4, 2013, Chinese Patent Application No. 201080024767.8, filed Apr. 7, 2010, pp. 1-19 with English Translation.
Author Unknown, "Domain Name System", Wikipedia.org, edit date Mar. 21, 2009, pp. 1-15, accessed <http://en.wikipedia.org/w/index.php?title=Domain_Name_System&oldid=278678031>.
Pal et al., "Supporting Sale Content-Inspection of Web Traffic", In CrossTalk Sep. 1, 2008, pp. 19-23 (retrieved May 23, 2010), retrieved from the internet <URL:http://www.dist-systems.bbn.com/papers/2008/CrossTalk/0809PalAtighetchi.pdf> entire document, especially: p. 19, col. 2, para 2 and col. 3. para 2; p. 20, col. 2. para 3 and col. 3, para 2-3; p. 21. col. 1, para 2-3
International Search Report and Written Opinions corresponding to PCT/US2010/30214 application.
International Search Report and Written Opinions corresponding to PCT/US2010/30207 application.
International Search Report and Written Opinion corresponding to PCT/US2010/30211 application.

* cited by examiner

DOMAIN POPULARITY SCORING

CROSS-REFERENCE TO RELATED APPLICATIONS

This application is a continuation of U.S. application Ser. No. 12/755,049, filed Apr. 6, 2010, which claims priority from U.S. Provisional Application No. 61/167,521, filed Apr. 7, 2009, U.S. Provisional Application No. 61/167,523, filed Apr. 7, 2009, and U.S. Provisional Application No. 61/167,528, filed Apr. 7, 2009. The previously filed applications are hereby incorporated by reference in their entirety.

BACKGROUND OF THE INVENTION

Understanding user activity on the Internet is becoming more important, and more difficult, as the Internet continues to expand. Commercial use of the internet is one area that has expanded dramatically in the last decade, and one that has a particular interest in understanding, monitoring and predicting user activity. One significant aspect regarding the commercial use of the internet is advertising. Advertisers may use factors such as traffic rankings in determining an appropriate web site or domain to advertise particular content. Likewise, web site owners may use traffic ranking to establish an appropriate fee for advertising on their web site. As known by those of skill in the art, internet advertising has also taken many different forms that may directly demonstrate the effectiveness of a particular advertisement, such as pay per click (PPC) applications. However, traffic rankings are still an important aspect of internet advertising, as well as other aspects of internet infrastructure management. For example, as the number of active web sites on the internet grows, there is an increased demand for accurate traffic ratings to inform decisions such as server management, web development, advertising focus and rates. However, there are limitations on the capabilities of conventional traffic monitoring services that typically monitor the traffic of users or web sites to calculate traffic scores.

A description of the ways in which the Internet is intrinsically organized can be helpful in understanding the challenges related to efficiently monitoring and rating the traffic for particular web sites on the internet.

The process of establishing a web site on the internet typically begins with a registrant registering a specific domain name through a registrar. The registrant is typically an individual or organization that identifies a domain name, such as "example.com". The registrant contacts a registrar to process the name registration. The registrar sends the necessary domain name service (DNS) information to a registry. A registrar may maintain a database containing additional customer information beyond that which is sent to the registry.

The registry receives DNS information from registrars, inserts that information into a centralized database and propagates the information on the internet so that domain names can be found by users around the world.

In general, the DNS is the part of the Internet infrastructure that translates human-readable domain names into the Internet Protocol (IP) numbers needed to establish TCP/IP communication over the Internet. That is, DNS allows users to refer to web sites, and other resources, using easier to remember domain names, such as "www.example.com", rather than the numeric IP addresses, such as "123.4.56.78", assigned to computers on the Internet. Each domain name is made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g. the "example" level in "www.example.com". Each second-level domain can include a number of third-level domains located immediately to the left of the second-level domain, e.g. the "www" level in "www.example.com". There can be additional level domains as well, with virtually no limitation. For example, a domain with additional domain levels could be "www.photos.example.com".

Additional non-domain information may be included in a Uniform Resource Identifier ("URI") structure that includes the domain name. For example, a "path" part is a sequence of segments (conceptually similar to directories, though not necessarily representing them) separated by a forward slash ("/"). This information may be included immediately to the right of the domain name, such as the "blog" in "www.example.com/blog", and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page that may be part of the same, or a different, domain.

Related domain names, and content, may be organized in a hierarchical, or nested, manner, such as "www.example.com"; "www.blog.example.com"; "www.example.com/blog"; or "blog.example.com" etc, each with a different significance. Such related domains need not share similarities in the actual IP address to which the various domain names resolve to. In this regard, part of the domain name may signify a particular server which is desired, for example, "mail.example.com" and www.example.com" may resolve to different servers, with different functions, for the same second-level domain.

The above registration and structural aspects of the internet are then used by end-user applications to find specific resources on the internet by using the DNS resolution process. Aspects of the DNS resolution process are discussed below to aid in an understanding of the subject matter of the present application.

The responsibility for operating each TLD (including maintaining a registry of the second-level domains within the TLD) is delegated to a particular domain name registry. The registry is responsible for converting domain names to IP addresses ("resolving") through DNS servers that maintain such information in large databases, and operating its top-level domain. The DNS stores IP addresses and domain names, facilitating service to addresses in TLDs, such as .com, .net, .edu, and .tv. Resolving is the process by which domain names are matched with corresponding IP numbers. Resolving is accomplished by a combination of computers and software, referred to as name servers that use the data in the DNS to determine which IP numbers correspond to a particular domain name. The following general definitions will be used herein.

Resolve: To translate domain name to IP address.

Resolver: A computer issuing a query in order to resolve a domain name.

Name server: A computer receiving queries and answering them directly or via resolve against other name servers.

Subnet: A group of IP addresses sharing octets of the IP address.

Internet domains can be divided to groups according to their TLD suffix (e.g. .com, .net, .co.uk . . . ) with different registries responsible for each of them. A single registry may be responsible for several of these groups, such as the VeriSign registry which is responsible for .com and .net domains.

The DNS is maintained by a distributed database system, which uses the client-server model. The nodes of this database are the name servers. Each domain or subdomain has one or more authoritative DNS servers that publish information about that domain and the name servers of any domains subordinate to it. The top of the hierarchy is served by the root name servers, the servers to query when looking up (resolving) a TLD.

The DNS distributes the responsibility of assigning domain names and mapping those names to IP addresses by designating authoritative name servers for each domain. Authoritative name servers are assigned to be responsible for their particular domain.

In theory a fully qualified domain name may have several name segments, (e.g. "www.one.type.example.com." For querying purposes, the name segment is typically interpreted by segment, from right to left. At each step along the way, a corresponding DNS server is queried to provide a pointer to the next server which it should consult.

Because of the huge volume of requests generated by DNS, the resolution process also allows for caching (i.e. the local recording and subsequent consultation of the results of a DNS query) for a given period of time after a successful answer. How long a resolver caches a DNS response (i.e. how long a DNS response is considered valid) is determined by a value called the time to live (TTL). The TTL is generally set by the administrator of the DNS server handling the response. The period of validity may vary from just seconds to days or even weeks.

Based on the DNS structure, as well as the caching function, there are two classifications typically applied to the name servers, authoritative and recursive (caching). An authoritative name server is a name server that gives original, definitive answers ("authoritative" answers) to DNS queries. Every domain name must be assigned a set of authoritative name servers that are responsible for resolving the domain name.

As indicated above, the DNS also uses recursive cache servers, which store DNS query results for a period of time determined TTL of the domain name record in question. Typically, such caching DNS servers also implement the recursive algorithm necessary to resolve a given name starting with the DNS root through to the authoritative name servers of the queried domain. Internet service providers (ISPs) typically provide recursive caching name servers for their customers. In addition, many home networking routers implement DNS caches and recursors to improve efficiency in the local network.

DNS "stub" resolvers are also known that essentially operate as a cache-less application to resolve DNS names into IP addresses. The DNS stub resolver forwards DNS queries to the DNS server configured for the workstation (or server) and returns the DNS server's response to the requesting software. If a stub resolver queries a caching nameserver for a record that is being held by the caching server before the TTL has expired, the caching server will reply with the cached resource record rather than retrieve it from the authoritative name server again.

SUMMARY OF THE INVENTION

There are currently several approaches used to provide web traffic information. Known methods include panel-centric approaches in which selected samples of users are provided with a client agent that monitors their web traffic usage. There are also site-centric approaches in which web traffic statistics are gathered directly from the web server for a web site. Other methods focus on the Internet Service Provider (ISP), and gather web usage traffic from logs of ISP's that are providing the web data to the client. However, the known methods each suffer from drawbacks related to the point at which the data is gathered, the amount of data gathered and/or the materiality of the data that is gathered. For example, panel-centric applications are limited in their ability to obtain holistic views of activity on the Internet because they are limited to the selected users who are being monitored. Additionally, any attempt to catalogue the activities of the billions of individual Internet users, even if possible, would create massive amounts of data that would quickly reach an unmanageable level. ISP's are also limited in their ability to characterize the overall activity of the Internet based on their particular client base, geographical interests, and other factors that inherently or implicitly restrict the traffic that the particular ISP is privy to.

There are additional problems in determining accurate and meaningful traffic rankings for domains. In general, Internet traffic can be divided into two groups: user oriented traffic, and machine oriented traffic. User oriented traffic can be considered as activity generated by users browsing web sites. Machine oriented traffic can be considered as activity generated by automatic processes and services (e.g. antivirus updates, operation system updates, web services, etc.). For the purposes of commerce, including online advertising, identifying the user generated traffic driven into web sites is particularly important. Therefore, methods for measuring the user oriented traffic are preferable. However, this is a significant challenge because, for example, information regarding the nature of the requestor cannot be obtained from the incoming DNS queries themselves. Another challenge in distinguishing between the traffic types is caused by the architecture of the Internet DNS system, which refers queries initiated by intermediate DNS resolvers. This can obscure the nature of the end-user that initiated the request.

The present subject matter addresses many of the above issues through various mechanisms using DNS traffic data obtained at authoritative name servers, such as the TLD DNS servers, along with information obtained from web sites associated with the a subject domain. According to aspects of the invention, domains across the Internet can be ranked in ways that known systems do not contemplate or achieve. In embodiments, several attributes and/or measurements may be obtained from the DNS traffic seen at authoritative name servers, such as the TLD DNS server for various domains, and combined with information obtained from a web site associated with the domain to calculate traffic scores. In this regard, web sites associated with the domain may include, for example, web sites responsive to an authoritative address for the domain, web sites with related domain names, web sites linked to or from the web site of the domain, and the like. The calculated scores may be used to rank the domains.

The inventors have recognized that a challenge in converting DNS data into a meaningful and useful form is the size of the DNS data. Registries may operate several resolution sites located at different parts of the world. The sites for one registry may answer over fifty billion queries a day. This huge number of queries presents an overwhelming challenge in attempts to analyze raw data. The present application provides systems and methods for data aggregation that may reduce the overall amount of data into a more manageable size. According to these methods, it has also been found that a more accurate picture of meaningful activity on the Internet can be developed, beyond what has been achieved by conventional methods using raw traffic data.

Disclosed methods may include different aggregation formats including, for example, domain summarized traffic information, which may list several statistics per domain per day, and domain detailed traffic information, which may list more detailed information about DNS queries. It has been found that a particularly useful example of DNS query information are the identities of a set of resolvers generating the queries. In addition, disclosed methods may obtain information from a web page associated with the domain. Such information, and other statistical analyses, may provide benefits in, for example, adjusting and weighting traffic scores to obtain a more accurate assessment of the popularity and/or value of a particular domain.

Embodiments of the invention may include automated methods for scoring a domain in which a request to resolve a domain name is received at an authoritative name server, such as a TLD DNS. Based on the received request, a counter may be incremented for the domain name. In embodiments, different counters may be incremented depending on a predetermined format of the request. For example, requests that include a "www" string may be counted separately from requests that do not include a "www" string. In embodiments, different format counters may have different weighting factors applied to them in calculating a domain traffic or other score. For example, a count of the requests including the "www" string may be weighted differently in such calculations than a count of the requests not including the "www" string.

Embodiments may include distinguishing between types of addresses requested in DNS queries. For example, embodiments may separately recognize exact requests, "www" requests, and other requests. As used herein, an exact request is a request that matches a predetermined criteria, such as a specific number of labels. Exact requests may be identified in embodiments as containing two labels, such as an exact $2^{nd}$ level domain name requested without any prefix. For example, an exact request for the domain "example.com" may be "http://example.com/".

A "www" request is a request in which the character string "www" is included in a prefix. For example, a request that reads "http://www.example.com/", "http://www1.example.com/", and "http://AAA-www.example.com/", may be recognized as "www" requests. As used herein, an "other" request is a request that does not meet either of the "exact" or "www" criteria. This may include other prefixes as part of the request. For example, "http://jobs.example.com/", "http://mail.example.com/", and "http://AAA.BBB.example.com/", would be recognized as "other" requests, if no corresponding exact match was identified.

In embodiments, the following exemplary attributes about DNS queries for a domain may be obtained and used to calculate ranking:

WWW ("W") request hits. A count of hits on DNS records with "www" in the first label.

Exact ("E") request hits. A count of hits on DNS records with labels matching a predetermined criteria, e.g, only two labels such as "example.com".

Other ("O") request hits. A count of hits on DNS records which fall into neither category above.

Embodiments may include comparing a first number of requests incremented by a first counter corresponding to a first request format to a second number of requests incremented by a second counter corresponding to a second request format, and applying a weighting factor to a score of at least one of the counters based on the comparison. For example, using the criteria identified above, a predominance of O format requests compared to the W and/or E requests, may provide a basis for discounting one or more counter scores, such as the O counter, by an appropriate weighting or fine factor.

Embodiments may also include, the counter being limited to a predetermined number of counts for a particular requesting set of resolvers in a predetermined period of time. For example, a "server counter" for a set of resolvers may be limited one count per 24-hour period. Embodiments may include resetting the counter after the predetermined period of time. In embodiments, calculating the domain traffic or other score may include applying a weighting factor to the counter based on information about a requesting set of resolvers.

Embodiments may include the weighting factor being based on various criteria such as, for example, a geographical location of the requesting subnet, a network traffic level of the requesting subnet, a network traffic type, and/or an architecture of the requesting subnet.

Embodiments may include judging whether the request to resolve the domain name is initiated by a user; and determining the weighting factor based on the judgment.

Embodiments may include incrementing a hit counter each time the authoritative name server receives a request to resolve the domain name. In addition, calculating the domain traffic score may be based upon the hit counter alone or in combination with one or more server counters.

Embodiments of the invention may include obtaining information from a web page associated with the domain, and a score for the domain may be calculated based upon a counter and the information obtained from the web page associated with the domain. Information obtained from the web page may take several forms, such as statistical, functional, and/or qualitative information, and combinations thereof. For example, obtaining information from a web page associated with the domain may include automatically obtaining link information from the web page and analyzing the status of network links corresponding to the link information. Analyzing the status of the link information may include searching for predetermined indicators such as domain redirections, domain errors, mirror content, and commonly linked sites. Such indicators may be used in interpreting the significance of links and/or the status of the web site itself, and determining a weighting factor for the counter and other scoring calculations. For example, calculating a score for the domain may include applying a quality factor based on a relationship between total links of the domain and responsive links of the domain. In embodiments, information may also be obtained from another web page that is linked to the domain. For example, a link score for a domain may be derived from scoring the inbound links, from other web pages, to the web page. A link score may be used along with a traffic score of the domain to calculate an overall score.

In embodiments, ratios of separate counters incremented for different request formats may be used in analyzing the significance of information obtained from a web site associated with the domain. For example, a ratio of a particular format counter's traffic for a domain may be compared to a link-type ratio in determining an appropriate weighting factor for one or more of the counters for the domain. A fine may be determined based on a difference between the format counter ratio and the link-type ratio.

Embodiments may include additional analyses including, for example, analyzing characters of a domain name of the domain and applying a weighting factor to the calculation based on the results of the analysis, determining a purpose of the domain and applying a weighting factor to the calculation based on the determined purpose, and/or determining a frequency at which information of the domain is updated and applying a weighting factor to the calculation based on the determined frequency.

Embodiments may include automatically calculating domain scores for a plurality of domains serviced by the authoritative name server based on counter scores and analyses of information obtained from websites associated with the domain. Additionally, the plurality of domains may be automatically ranked based on the domain scores. Embodiments may include calculating a ranking score based on a relative score for a domain among a predetermined category of domains. This may include comparing the domain score of a domain with other domain scores from the predetermined category of domains. Calculated traffic and/or ranking scores may be automatically distributed as part of a fee service, or used in determining other items such as an advertising rates, etc.

Embodiments may include determining various secondary values based on the rank of a domain such as, for example, an advertising rate, hosting value, and/or a popularity rating of the domain. As used herein, an advertising rate is understood as a rate at which advertising on a domain is valued for sale. The advertising rate can be used, for example, in the context of offering or completing an advertising transaction and/or providing a valuation to the owner of a domain. As used herein, a hosting value is a calculated value that represents the value of domain based on the described scoring methods. A hosting value can be used, for example, in transactions such as the sale of a domain, and/or providing the owner of a domain with a valuation of the domain. A popularity rating is a calculated value representing the popularity of the domain, and may be targeted to represent popularity of various types such as, for example, geographic popularity, user type popularity, traffic type popularity and the like. Through various combinations of the above factors, accurate rate tables used for various purposes may be developed for an extensive network of domains. This can be advantageous in providing a reliable and centralized advertising fee service, domain resale market, and the like, based on, or sponsored by, a TLD provider with information that is not otherwise available to other entities.

Embodiments may include calculating the traffic and/or ranking scores based on a TTL of DNS records for the domain.

Further advantages of the present subject matter will become apparent to those of ordinary skill in the art upon reading and understanding the following detailed description of the preferred embodiments.

DETAILED DESCRIPTION OF THE INVENTION

The following detailed description is provided with reference to exemplary embodiments for the ease of description and understanding. Applicants' invention is not limited to the disclosed embodiments, and encompasses other variations that fall within the overall scope of description provided herein.

Figure 1:
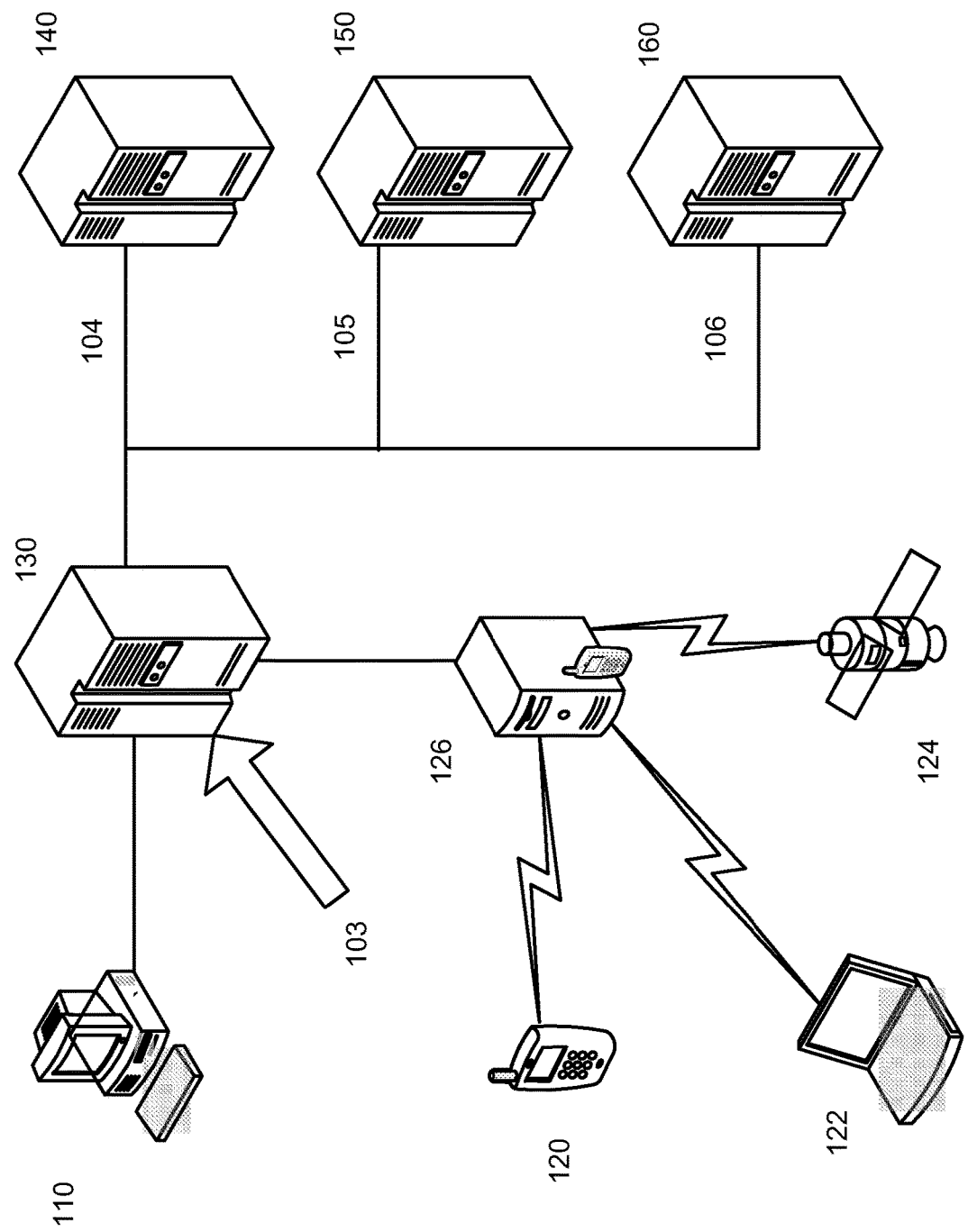
FIG. 1 depicts an exemplary system and related network in accordance with an embodiment of the present invention.

As indicated above, embodiments of the present invention may involve operations on a network, such as the Internet environment depicted in FIG. 1. A client computing device 110 may initiate a DNS request 103 to recursive name server 130. As suggested by FIG. 1, DNS requests 103 can be originated, or transmitted to recursive name server 130, from various sources such as mobile device 120, wireless computing device 122, other communication link 124, and/or intermediate network servers 126. The DNS request to resolve a domain name typically has n labels separated by periods. These labels are usually in some form that is easier to remember than the numerical IP address for a desires Internet resource, e.g. a web page. For the ease of description, the leftmost label may be considered to be the first label and the TLD is the nth label. Thus, in a request for "www.example.com", n=3, the first label would be "www" and the TLD would be ".com". As described above, the recursive name server 103 may transmit the DNS request to various authoritative servers 140, 150, 160 as part of the recursive name resolution. Alternatively, the requested DNS information may reside in a cache of recursive name server 130, subject to the DNS record's TTL, in which case, the query may be answered without referring to the authoritative name servers 140, 150, 160.

As mentioned above, embodiments may include distinguishing between types of addresses requested in DNS queries such as request 103. For example, request 103 may be evaluated, as passed along in requests 104, 105, or 106, to determined whether it is a W, E or O format request. A corresponding hit counter and/or server counter may be incremented based on the determined format of the request 103.

Figure 2:
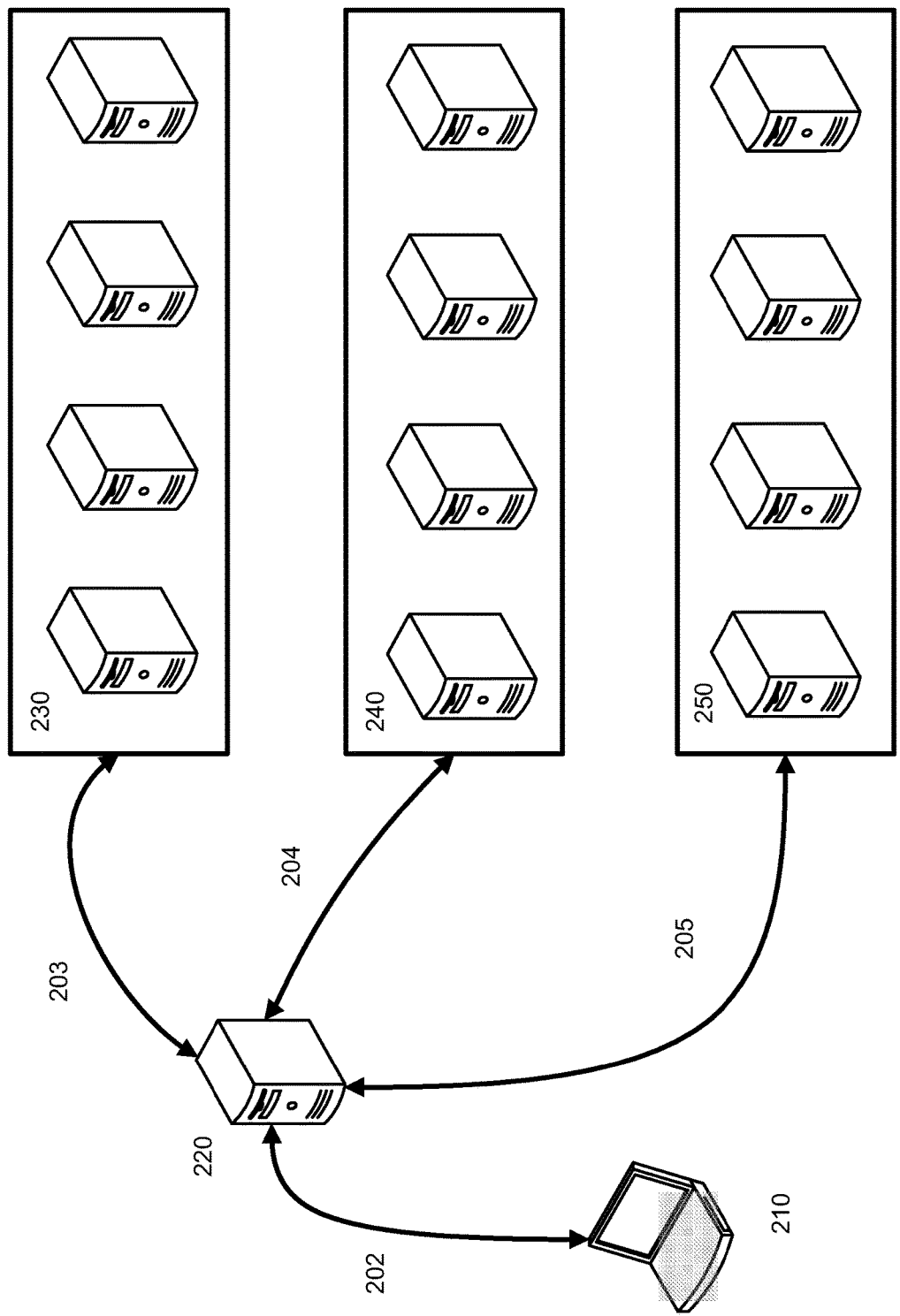
FIG. 2 depicts an exemplary system and related network in accordance with an embodiment of the present invention.

FIG. 2 depicts additional details regarding a recursive name server 220 and its interaction with authoritative name servers 230, 240, 250. In FIG. 2, authoritative servers 230 are root level authoritative servers. Each of these servers contains information for particular TLDs on the internet. The root level servers can direct requests for domains within their TLD to other authoritative servers managed by that TLD registry. For example, DNS request 202 from client 210 may include a request for "www.example.com". Recursive name server 220 may first check an internal cache for a corresponding DNS record. If one is not found, the DNS request may be forwarded at 203 to root level authoritative name servers 230. An authoritative root level server among servers 230 that is responsible for ".com" may return DNS information for "example.com" directing the requestor to authoritative name servers 240, in this case these servers represent the constellation of servers for a registry of ".com". As described herein, DNS requests, e.g., 203, 204, 205, can be counted at various authoritative servers, e.g., 230, 240, 250. In embodiments, the counting may be done at a TLD name server such as, for example, 230. Other authoritative name servers 240, 250 can also count DNS hits for those records handled by the respective server. Embodiments may include combining the scores from various servers, and/or TLDs, e.g. ".com.", ".net", ".edu", ".uk", to arrive at combined rankings.

Figure 3:
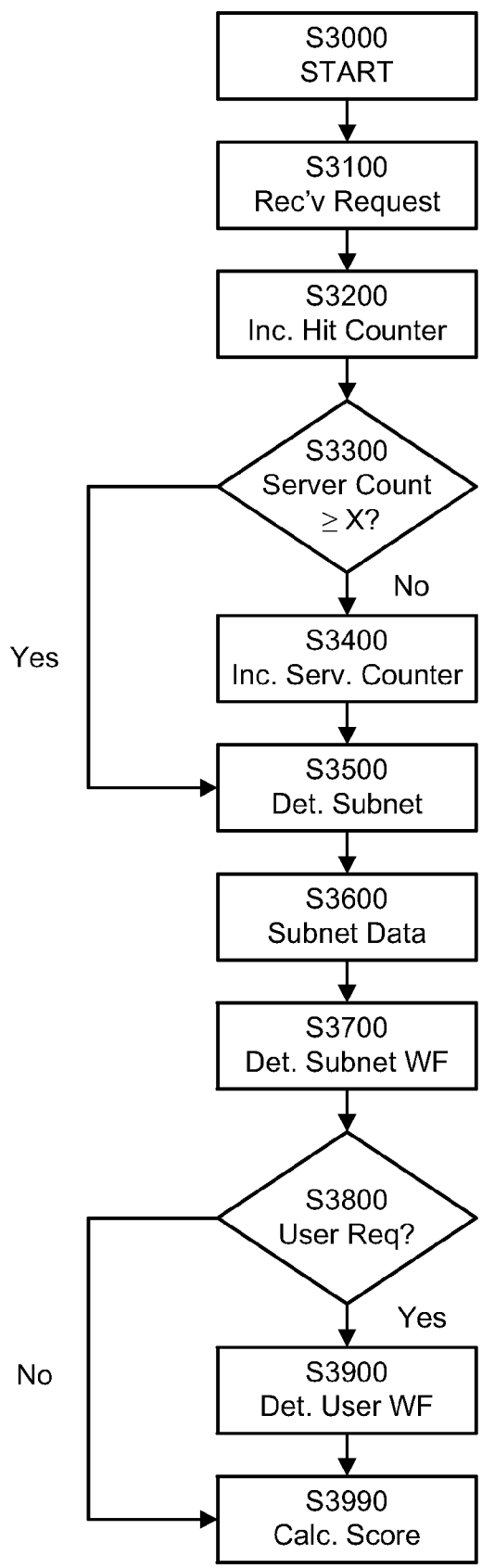
FIG. 3 depicts aspects of an exemplary method in accordance with an embodiment of the present invention.

In embodiments, determinations may be made to count a request or not count a request on a given counter. For example, certain counters, such as a "server counter", may be limited to a single count per a predetermined period of time. As depicted in FIG. 3, a request may be received in S3100. A relevant hit counter may be incremented in S3200. In S3300 a determination may be made whether to increment a server counter. In this example, a current count of the server counter may be compared to a predetermined value "X". If the server count is greater than, or equal to, X, the determination is made not to increment the server counter again, and the method may proceed to S3500. If the server count is less than X, the method may proceed with S3400 where the server counter is incremented. The server count may be automatically reset after the predetermined period of time. Although described in the context of a server counter, other counters may be limited in similar manner, such as, counters associated with a particular IP address, a set of resolvers, etc. As described further below, limiting the count of certain counters may be used to develop a more accurate picture of meaningful Internet activities. These limited counters may be considered alone or in combination with hit counters to provide users with a manageable and accurate representation of overall web traffic. For example, using a limited counter may reduce the unwanted effects of artificial or unreliable traffic indicators, that may originate from a particular server, a set of resolvers, IP address, etc.

In S3500, a set of resolvers associated with the request may be determined. For ease of depiction in the figures, an exemplary set of resolvers may be referred to as a subnet. However, as discussed herein, features related to sets of resolvers are not limited to subnets per se, and may include other sets of resolvers that may represent various associations, such as, for example, address, geographic, organizational, and type, and combinations thereof. In embodiments, the determination may be made prior to determining whether to increment the server counter in S3300, such as to identify the appropriate counter to be evaluated. Data relevant to the set of resolvers may be determined and/or accessed in S3500. For example, as discussed further below, data relevant to the location, traffic level, traffic type etc. for the set of resolvers may be determined, calculated and/or accessed. In embodiments, information about a particularly identified requesting server may be used to apply an appropriate weighting factor, such as, for example, if the identified server is known to be utilized by web crawlers, or the like, that generate significant non-user traffic. A list of such servers may be stored in a database with or without appropriate weighting factors. Thus, requesting servers that appear to be, or are documented to be, data-oriented in nature can be penalized in the domain scoring. The method continues with S3700.

In S3700, a weighting factor (WF) for the set of resolvers is determined. This determination may be based on various data, as determined in S3600, and may be applied in calculating the score for the domain in S3900.

In S3800, the request may be evaluated to determine whether it represents user generated traffic. This determination may be based on various factors, such as, for example, information embedded the request, information regarding the originating set of resolvers, the subnet architecture and the like. Exemplary methods of making this determination are described further below. If S3800 indicates that the request is likely related to user generated traffic, a user weighting factor may be determined in S3900. In embodiments, user generated traffic may be given a higher WF than other traffic, such as traffic that is of undetermined origin, or traffic that is likely machine generated. In embodiments, only user generated traffic may be considered by applying a WF=1, and all other traffic disregarded by applying a WF=0. The method may continue with S3990 where a score and/or rank may be calculated for the domain based on values derived in the foregoing steps.

Figure 4:
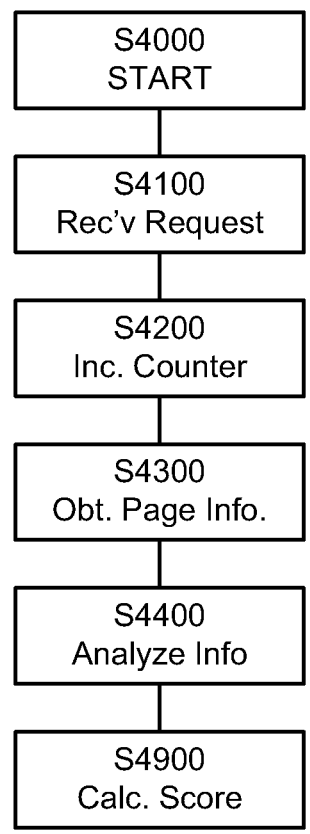
FIG. 4 depicts aspects of an exemplary method in accordance with an embodiment of the present invention.

FIG. 4 depicts further details with respect an exemplary method. As shown in FIG. 4, an exemplary method may begin in S4000, and proceed to S4100 where one or more DNS requests are received, which may be in a similar manner to S3100 described above. The method may continue with S4200.

In S4200, one or more counters may be incremented in similar manner to S3200 and S3400 described above. The method may continue with S4300.

In S4300, information may be obtained from a web site associated with the domain. The obtaining of such information may take many forms including, for example, obtaining information from a web site with an address corresponding to the authoritative address for the domain name of the request, a web site that shares a portion of address and/or domain name information with the web site matching the request, and/or obtaining information from a web site linked to and/or from a web site of the domain. The information obtained from the web page may also take several forms, such as statistical, functional, and/or qualitative information, and combinations thereof, some examples of which are discussed further below. The method may continue with S4400.

In S4400, information obtained from the web site may be analyzed to determine, for example, a content-based score, such as a link score, or a weighting factor to be applied to a traffic or other score for the domain. Various analyses and application will be discussed further below. For ease of description, examples of link-based scoring are included. However, the overall scope of the invention is not so limited and various other forms of content-based scoring are understood to be included as well. In general, content-based scoring and ranking looks to criteria that may be derived from the content of websites, such as quantitative, qualitative, and functional information, which may include various forms of particular code, certain files, and the like. In one example, a total number of links may be determined to or from a website. Some, or all, of the links may be automatically evaluated to determine, for example, the functioning of the links, and/or any redirections that occur. A ratio of the number of functioning, or non-functioning, links compared to the total number of links may be determined and a link-based rank and/or weighting factor may be calculated based on the ratio.

Aspects of link-based scoring may be achieved in part through web crawling techniques that automatically explore existing linkages in web pages. Through using an iterative process, a number of links to a particular domain may be determined, for example, it may be determined that Domain A has X number of links directed its web site. These links may be in various forms, and may be characterized in similar manner to the E, W, and O requests. That is, respective numbers of E, W and O links to the domain may be determined and used as bases for determining a link-based score, and/or analyzing the significance of other data. In embodiments, a rank of the web site with the link to the subject domain may be included in determining an appropriate score. For example, a page rank of domain A may be calculated based on an algorithm including a number of inbound links to domain A and a rank of each of the originating sites containing the links. Such methods will appropriately reward sites that are linked from other highly ranked sites. As in other situations discussed herein, the use of such metrics may provide a useful proxy for estimating a level of user traffic and evaluating the true popularity of a domain, versus its level of raw traffic.

It has also been found that numerous domain redirections exist throughout the Internet. Such redirections may refer a web client to an alternative web domain from the initial link. Therefore, the inventors have found it advantageous to set a logical state of a link to the destination domain, rather than the intermediate site. For example, if a given Domain A links to Domain B, and Domain B redirects to Domain C, the logical state may be set so that Domain A is considered to link to Domain C. Thus, for example, in calculating a link-based score for a domain, redirect sites may be discounted, such as Domain B in the example above, where, although there is an existent link to the site, its logical function is recognized as a redirect.

Link-based scores may also be calculated based on counting and analyzing links from the web site of the domain to other web sites. Such analysis may include detecting link format, whether the links function, and detecting types of errors that may be present. Some examples of domain errors and statuses that can be detected as part of the link analysis include HTTP response errors, name server errors, domain does not exist errors, disallowed robot files, unfound hosts, unfound web server found, etc. The inventors have found it useful to catalogue such errors with respect to a domain because error levels and types for target domain links may reflect the maintenance level of the directing domain.

For example, a domain with links pointing to a large proportion of non-existing domains, is assumed to be poorly maintained or not up to date. Such errors may be referred to as broken links. As part of the counting and analysis behind a link-based score looking at the web site of the domain, embodiments may include subtracting non-functioning links from the link total of the domain, and incrementing a broken link counter. A scoring algorithm may then be assessed a fine for the number of non-functioning links present on the domain. For example, a link quality score may be determined by dividing the number of responsive links by the total number of links. Alternatively, the links may be further analyzed to consider only those links that are associated with the domain, for example, those sites that are nominally under the control of the domain based on shared domain name portion, e.g. "www.example.com" and "mail.example.com" both share the same $2^{nd}$ level domain name. This number may provide more reliable and justifiable criteria for discounting the quality of a domain based on what would be considered the domain's reasonable responsibility. Scoring and weighting factors may also be based on the presence of mirror sites, link farms, and other architecture that may indicate an artificially high number of links. These may be automatically detected as part of the link analysis. Linked sites such as mirror sites may be deducted from the overall link score, or used to determine a fine. The method may continue with S4900.

In S4900, one or more scores and/or ranks may be calculated for the domain. In general, a score may be a criteria-based number that is derived through counting, applying weighting factors, calculations and the like. Ranks generally assign a number based on a relationship of respective criteria among domains. For example, a domain may be assigned a traffic score based on counter data and weighting factors, and assigned a traffic rank based on comparisons with other domains, which may include further weighting factors and/or normalization functions, etc. The score and/or rank may be based on scores and/or weighting factors derived from a hit counter, a server counter, and/or analysis of information obtained from the website associate with the domain. For example, in embodiments, an overall rank ("OR") of the domain may be calculated based on a traffic rank ("TR") obtained from DNS traffic scoring including hit and/or server counters, and a link-based rank ("LR") obtained from link-based scoring methods. Link-based scoring methods may include, for example, cataloguing and analyzing inbound links from other web sites to a web site of the domain, and/or outbound links from the web site of the domain to other web sites, including other websites of the domain.

An exemplary algorithm for calculating such a score could be:

$$OR=(W_{TR}*TR+W_{LR}*LR)/(W_{TR}+W_{LR})$$

Where:
$W_{TR}$ is a traffic rank weighting factor, and
$W_{LR}$ is a link rank weighting factor.

As indicated in the above formula, different weighting factors may be applied to TR and LR. Additionally, different weighting factors may be applied to different counters as part of calculating a score such as TR.

For example, scores from a W counter ("$C_W$"), an E counter ("$C_E$") and an O counter ("Co") may be separately weighted and combined according to:

$$TR=(W_W*C_W)+(W_E*C_E)+(W_O*C_O)$$

Where:
$W_W$ is a W counter weighting factor,
$W_E$ is an E counter weighting factor, and
$W_O$ is an O counter weighting factor.

Determining weighting factors for separate counter scores may be accomplished in several different ways. Such methods may include, for example, comparing related counter scores and calculating weighting factors based on the ratios of the comparison, analyzing information, such as links, obtained from web sites associated with the domain, and/or comparisons of counter data and information obtained from the web sites. One example of such techniques is discussed with reference to FIG. 5.

Figure 5:
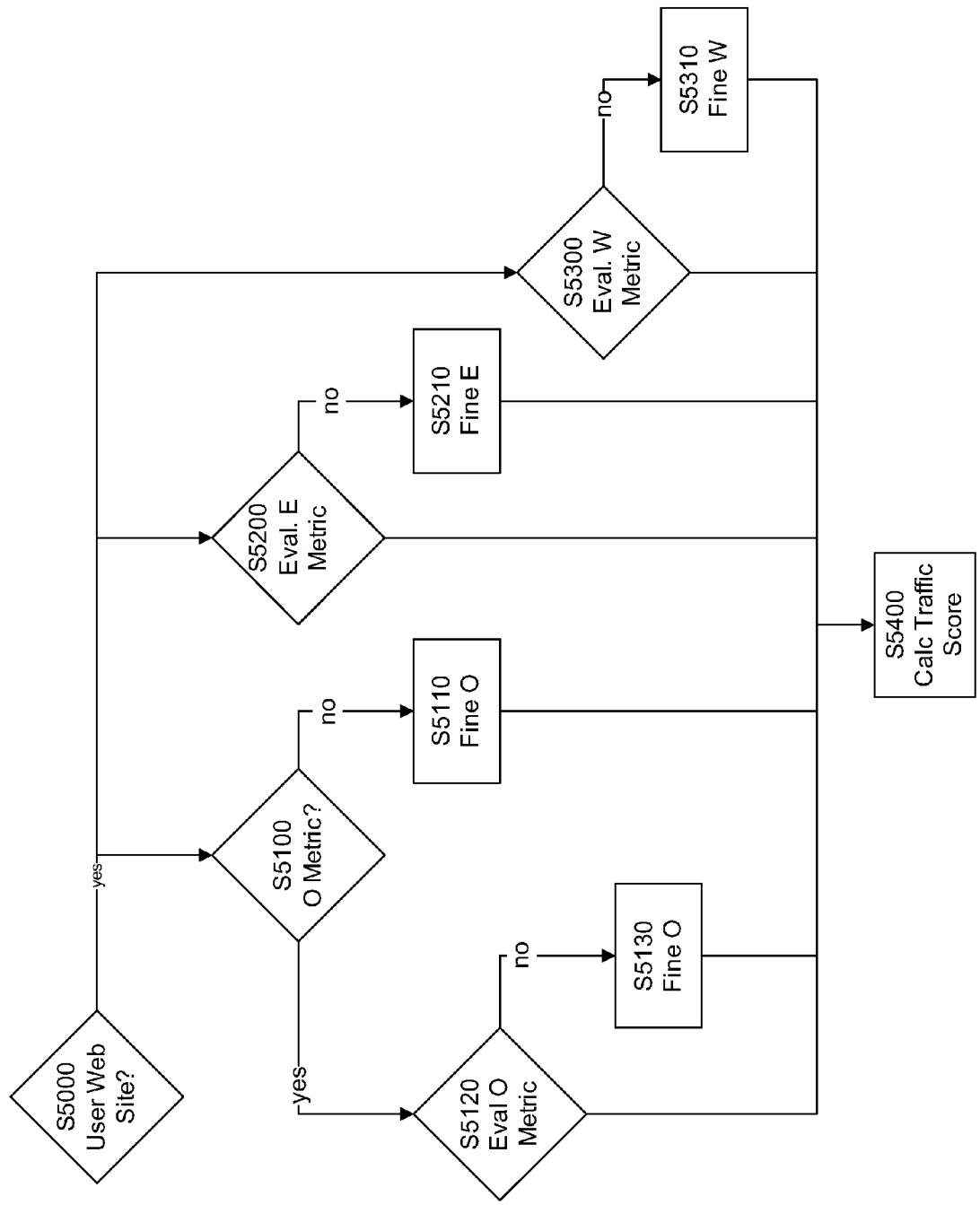
FIG. 5 depicts aspects of an exemplary method in accordance with an embodiment of the present invention.

As shown in FIG. 5, an exemplary method of determining a weighting factor for a particular counter may begin in S5000, where it is determined if the domain has a web site that is user oriented, e.g. it supports web browsing to some degree. If it is determined that the domain satisfies the criteria applied in S5000, the method may proceed, e.g. in parallel, with S5100, S5200, and S5300.

In S5100, it is determined whether there is an O traffic metric relevant for user generated traffic, for example, it may be determined whether a number of O links satisfy a predetermined criteria such as a minimum number of links. If it is determined that the domain does not satisfy the criteria, e.g. the domain does not present a predetermined number of O links, the method may proceed to S5100, where an appropriate fine may be assessed to be applied to the O traffic when calculating the domain traffic score.

If the domain satisfies the O metric criteria in S5100, the method may proceed with S5120. In S5120, an O traffic metric may be evaluated to determine whether it appears to be representative for user generated traffic. For example a W traffic ratio may be compared to a predetermined criteria to determine if the W ratio is high enough with respect to the other traffic levels to accept the O traffic metric without modification. The predetermined threshold may be a relatively low number compared to the O and E ratios, for example, a W ratio of approximately >0.1 may be sufficient. It should be noted that, although the foregoing ratio, and other ratios listed below, have been found to be effective in certain circumstances, the scope of the invention is not limited to these exemplary figures. Additionally, an O traffic ratio and/or O link ratio may be evaluated to determine whether they are smaller than a predetermined criteria to accept the O traffic metric without modification. For example, an O traffic ratio and/or O link ratio of approximately <0.25 may suggest accepting the O traffic for scoring purposes without modification. If the criteria applied in S5120 are not satisfied, the method may continue with S5130, where an appropriate fine may be assessed to be applied to the O traffic when calculating the domain traffic score. The fine applied in S5130 may be the same as, or different than the fine applied in S5110.

If the domain satisfies the O metric criteria in S5120, the method may proceed to S5400 without a fine being assessed to the O traffic score.

Similar processes may be performed to evaluate the E and W traffic for the domain. For example, in S5200 it may be determined whether an E traffic metric is representative for user generated traffic. This may be done, for example, by comparing a W traffic ratio and an E traffic ratio to determined whether the ratios of the E traffic and W traffic satisfy a predetermined criteria, for example, W traffic ratio approximately >0.1, and E traffic ratio approximately <0.5. Additionally, an E traffic ratio and/or an E link ratio may be evaluated based on predetermined conditions, such as, for example, an E traffic ratio and/or E link ratio approximately <0.4. If the E metric does not satisfy the applied criteria, the method may continue with S5210, where an appropriate fine may be assessed to be applied to the E traffic when calculating the domain traffic score.

If the domain satisfies the E metric criteria in S5200, the method may proceed to S5400 without a fine being assessed to the E traffic score.

Likewise, the W traffic metric may also be evaluated in S5300 to determine whether it is representative of user generated traffic. For example, a W traffic ratio and/or a W link ratio may be evaluated based on predetermined conditions such as an W traffic ratio and/or W link ratio approximately <0.4.

If the W metric does not satisfy the applied criteria, the method may continue with S5310, where an appropriate fine may be assessed to be applied to the W traffic when calculating the domain traffic score.

If the domain satisfies the W metric criteria in S5300, the method may proceed to S5400 without a fine being assessed to the W traffic score.

Upon completion of one or more of S5100, 5200 and/or 5300, the method may proceed to S5400, where a traffic score may be calculated for the domain including any fines assessed in S5110, S5130, S5210 and/or S5310.

Embodiments may also include comparing a number of requests incremented by a first counter corresponding to a first request format to a number of requests incremented by one or more second counter(s) corresponding to other request formats. For example, an O format counter may be compared to a W and/or E counter. It has been found that, in certain circumstances, a predominance of O format requests compared to the W and/or E requests, may provide a basis for discounting one or more counter scores, such as the O counter, or the overall page score/rank, by an appropriate weighting or fine factor. Thus, in embodiments, a weighting factor may be applied to a score of at least one of the counters, or to a page score/rank, based on a comparison of the relative traffic levels, and the like. In embodiments, the O counter, or page score/rank, is reduced when the E counter and/or the W counter <1/10 of the O counter.

In embodiments, ratios of separate counters incremented for different request formats may be used in analyzing the significance of information obtained from a web site associated with the domain. For example, a ratio of a particular format counter's traffic for a domain may be compared to a link-type ratio in determining an appropriate weighting factor for one or more of the counters for the domain. A fine may be determined based on a difference between the format counter ratio and the link-type ratio.

Figure 6:
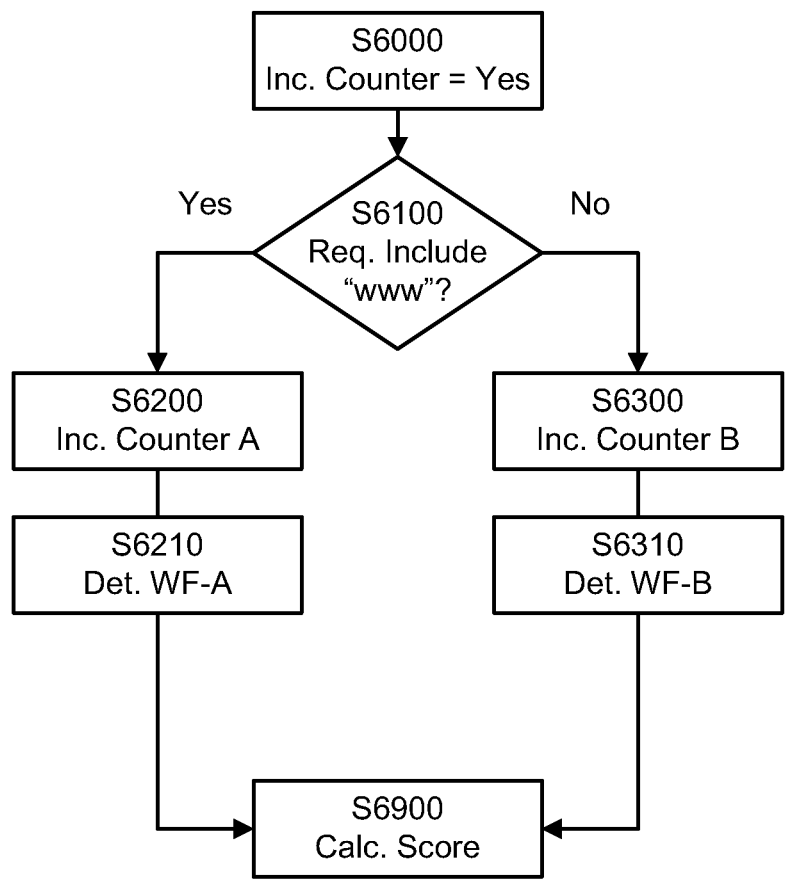
FIG. 6 depicts aspects of an exemplary method in accordance with an embodiment of the present invention.

With reference to FIG. 6, exemplary methods may include determining if a counter is to be incremented with respect to a received request in S6000, e.g. in a similar manner to S3300 in FIG. 3. As detailed above, in some embodiments, a hit counter may be incremented for received DNS requests for a domain. In some instances, it may be determined that a limited counter will not be incremented. In the event that the counter in question will be incremented, the method may proceed with S6100.

In S6100, the request may be evaluated to determine whether the first label of a received domain name includes the string "www". The string may be an independent part of the requested address, as in the case of "www.example-.com", or nested with other characters, such as "www1.example.com". If it is determined that the first label includes the string "www", then the method may proceed with S6200, where a counter "A" may be incremented, such as a www counter for the domain name. If the first label of the received domain name does not include the string "www", the method may proceed to S6300.

In S6300, a counter "B" may be incremented, such as a miscellaneous counter for the domain name. Although it is not required to count miscellaneous requests, i.e. requests that do not meet any of the preceding categories, a miscellaneous counter may provide advantages in evaluating the meaningfulness of detected traffic. For example, a miscellaneous counter may be used in comparison with the www counter to determine a percentage of traffic that is apparently driven by human interaction.

In S6210, and/or S6310, a weighting factor may be determined and/or assigned to the counters A and/or B, respectively. Weighting factors may be applied to all, or less than all, of the counters for a domain. Assigning a weighting factor can be based on several factors related to the nature of the counter and other information gathered with respect to the domain. Weighting factors may also be applied in a dynamic manner. For example, over the course of time, the counts of the different counters for a domain may change or information may be developed regarding the domain. This may prompt a change in one or more of the weighting factors applied to the counters for the domain. The method may continue with S6900

In S6900, a score may be calculated for the domain, such as a traffic score. The traffic score may be based on a plurality of the counters. It should be noted that it is not required to use counts from all of the relevant counters. Scores may be calculated based on one, two or more counts, with any relevant weighting factors considered. Thus, a domain traffic score may be calculated based upon a plurality of the counters, and may include applying a weighting factor to at least one of the counters.

Figure 7:
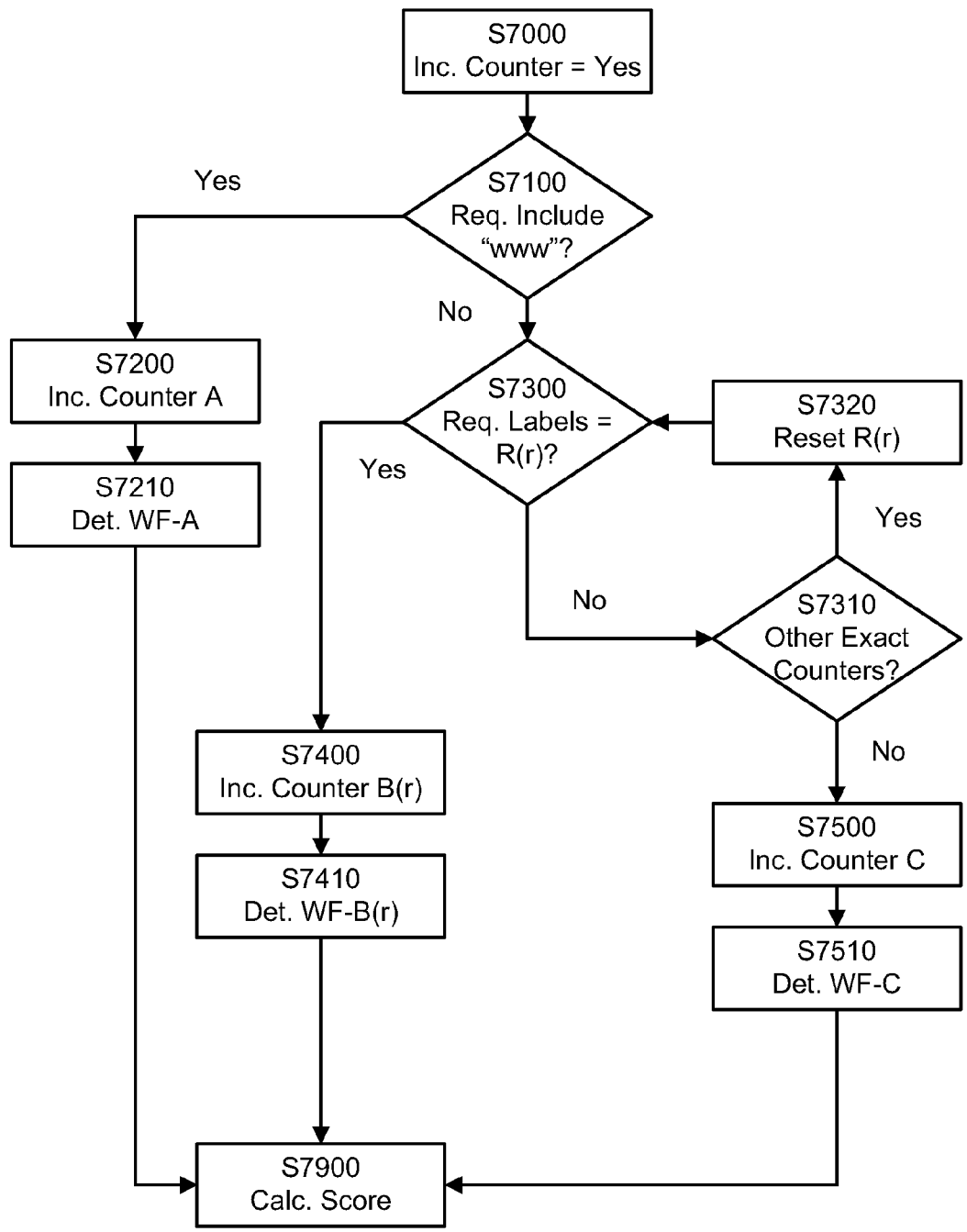
FIG. 7 depicts aspects of an exemplary method in accordance with an embodiment of the present invention.

With reference to FIG. 7, exemplary methods may include determining if a counter is to be incremented with respect to a received request in S7000, e.g. in a similar manner to S3300 in FIG. 3. As detailed above, in some embodiments, a hit counter may be incremented for received DNS requests for a domain. In some instances, it may be determined that a limited counter will not be incremented. In the event that the counter in question will be incremented, the method may proceed with S7100.

In S7100, the request may be evaluated to determine whether the first label of a received domain name includes the string "www". The string may be an independent part of the requested address, as in the case of "www.example.com", or nested with other characters, such as "www1.example.com". If it is determined that the first label includes the string "www", then the method may proceed with S7200, where a counter "A" may be incremented, such as a www counter for the domain name. If the first label of the received domain name does not include the string "www", the method may proceed to S7300.

In S7300, the request may be evaluated to determine whether the labels satisfy a predetermined condition "R(r)". R(r) can take numerous forms including a predetermined number of labels, a specified string, or other features of DNS request. In the case of designating a number of labels, described embodiments include where R(2)=two labels. If the received domain name has only the predetermined number R(2) of labels, e.g. two labels in "example.com", then the method may proceed to S7400, where a counter B(r) is incremented, such as a two-label "exact" counter B(2) for the domain name. If the request does not have only the designed number R of labels, e.g. it has more than two labels when the predetermined number R of labels is two, then the method may proceed with S7310. Embodiments may include a plurality of B counters, e.g. multiple exact counters. These may include, for example, separate counters for various numbers for R(r), or different versions, of "exact" counters for exact portions of domain strings. As an example, an additional counter B(3) may be incremented in response to a request for "mail.example.com", in which R=3. As another example, requests with a particular string, e.g. "mail", may be counted by a counter, B("mail"), when the request contains the string, e.g. "mail5.example.com". This may be implemented by determining whether additional exact counters B(r) are being implemented in S7310. If there are other exact counters, the method may proceed to S7320 where R(r) may be reset to the new value for counter B(r). After R(r) is reset, the method may continue back to S7300 to determine if the requests satisfy the new criteria R(r). S7300, S7310 and S7320 can be reiterated until R(r) is satisfied, or there are no remaining exact counters. If there are no remaining exact counters, the method may proceed to S7500.

In S7500, a counter "C" may be incremented, such as a miscellaneous counter for the domain name. Although it is not required to count miscellaneous requests, i.e. requests that do not meet any of the preceding categories, a miscellaneous counter may provide advantages in evaluating the meaningfulness of detected traffic. For example, a miscellaneous counter may be used in comparison with the www counter and the exact counter(s) to determine a percentage of traffic that is apparently driven by human interaction.

In S7210, S7410, and/or S7510, a weighting factor may be determined and/or assigned to the counters A, B(r) and/or C, respectively. Weighting factors may be applied to all, or less than all, of the counters for a domain. For example, a weighting factor may be applied to one, two, or all counters for a domain. Assigning a weighting factor can be based on several factors related to the nature of the counter and other information gathered with respect to the domain. Weighting factors may also be applied in a dynamic manner. For example, over the course of time, the counts of the different counters for a domain may change or information may be developed regarding the domain. This may prompt a change in one or more of the weighting factors applied to the counters for the domain. The method may continue with S7900

In S7900, a score may be calculated for the domain, such as a traffic score. The traffic score may be based on a plurality of the counters. It should be noted that it is not required to use counts from all of the relevant counters. Scores may be calculated based on one, two or more counts, with any relevant weighting factors considered. Thus, a domain traffic score may be calculated based upon a plurality of the counters, and may include applying a weighting factor to at least one of the counters.

As indicated previously, when a recursive name server gets an answer to a DNS query, it may cache it for future use. The time that each answer is saved in the cache is based on the TTL. The inventors have observed that measuring a domains' traffic by the total number of queries targeting the domain may have inaccuracies based on the caching function and the TTL for the DNS record. Compensating for the caching function can be particularly difficult in large-scale implementations based on the fact that each domain/resolver may manage its TTL differently. For instance, a resolver may refresh its cache every 6 hours, while another resolver may refresh its cache every 12 hours. Even if both resolvers are asked for a given domain the exact number of times, roughly speaking, the first resolver would be expected to generate twice as much query traffic up the DNS chain for this domain, compared to the second, even though both resolvers are representing the same amount of user-generated traffic to the domain. The inventors have developed several features to address this issue.

As a first example, a weighting score may be determined based on a TTL for the DNS file. This can compensate, somewhat, for limitations of hit counters linked to authoritative name servers, that only see requests that are actually forwarded to the server. Based on the number of requests forwarded to the server, a weighting factor based on the TTL can be used to calculate an estimate of the total traffic that is being directed to the domain. In general, traffic for sites with a relatively long TTL may receive a higher weight factor than those with shorter TTLs. Weighting factors can be established based on a ratio of TTLs among the scored/ranked domains.

As discussed herein, disclosed methods may be directed to observing the number of distinct querying IP addresses, set of resolvers, and the like, which has been found to introduce less noise and less dependence on the TTL and caching policy of each individual resolver. This approach has been found to be particularly useful in the field of observing traffic at the level of the TLD and other authoritative name servers, which may see enormous volumes of overall traffic. The metric of unique querying IP addresses, set of resolvers, and the like, can also prevent large offsets received by the total hit counters. For example, rather than relying exclusively on a total volume of traffic reflected by a hit counter, each distinct querying IP addresses, set of resolvers, and the like, may be counted only once per predetermined period of time, e.g. a 24-hour period.

In this regard, it is useful to consider two types of metrics:

Hits (H):The total number of queries generated for a given domain.

Subnets (S):The number of distinct resolver IP addresses, set of resolvers and the like generating queries for a given domain.

As discussed above, a given query can request one of three types of domain targets: www, Exact, Other. The inventors have observed several factors that help to meaningfully interpret the nature of the traffic based on the counts of the respective requests. This can help in understanding the extent to which each query of a particular type reflects user traffic, as opposed to non-user traffic, such as web services, etc.

With regards to www queries, it may be assumed that the majority of traffic referring to such targets is user-oriented. However, while www queries typically reflect user-oriented traffic in a domain, they do not always comprise all of the user-oriented traffic for the domain. It has been found that, for some domains, a portion of the user-oriented traffic resides within the "Exact" and "Other" metrics. For instance, the inventors have found that, for some popular web sites, less than 10% of the requests fall within the www category. Therefore, calculating a score based only on the www metric can result in certain web sites being ranked much lower than they should be based on the actual traffic that the web site is seeing. This has been found to be particularly relevant in evaluating the popularity of large domains in which the "Other" queries may comprise a large proportion of user-oriented traffic. For instance, a domain "example.com" may see most traffic directed to popular sub-domains, e.g. mail.example.com; games.example.com; news.example.com; etc.

It has been found that the significance of "Other" traffic may vary depending on the overall level of traffic for a domain. This observation has been taken into account in formulating the various methodologies described herein. For example, although Other traffic may normally be given a lower weight factor than Exact traffic, in embodiments, the weight factor for Other traffic may be increased according to overall traffic volume.

Surprisingly, the inventors have observed that considering both of the "www" and "exact" traffic metrics yields particularly favorable results. While the "exact" metric by itself does not fulfill a clear trend or consistency, when combined with the "www" metric, a clear pattern is observed. Thus, it has been determined that the two metrics complement one another in an unexpected way.

The inventors have relied on the foregoing observation to develop a streamlined and accurate approach for measuring a given domain's performance by comparing its incoming traffic in a given period to the overall traffic in that period. In embodiments, www hits may be counted separately from all other requests. Alternatively, all three DNS target types may be included, e.g. W, E and O, and each may be assigned a different weight. As an additional feature, "set of resolvers" metrics may be used, alone, or in combination with "Hit" metrics. For example, the following represents an embodiment of the disclosed methodologies:

Calculate each domain's W/E/O average daily ratios for the given period; in other words, for each domain, calculate the average of its daily ratio between its distinct set of resolvers metric and the overall number of distinct set of resolvers that day. This can be done for each of the target types individually; W/E/O:

$$SW\_Ratio(D, P) = \frac{1}{|P|} \cdot \sum_{Day_i \in P} \frac{SW(D, Day_i)}{SW(All, Day_i)}$$

$$SE\_Ratio(D, P) = \frac{1}{|P|} \cdot \sum_{Day_i \in P} \frac{SE(D, Day_i)}{SE(All, Day_i)}$$

$$SO\_Ratio(D, P) = \frac{1}{|P|} \cdot \sum_{Day_i \in P} \frac{SO(D, Day_i)}{SO(All, Day_i)}$$

Where D is Domain; P is Period (|P| is the size of the period in days); and SW/E/O(All, $Day_i$) is the overall number of distinct set of resolvers querying W/E/O accordingly.

Calculate the overall score for the domain within the given period:

$$Score(D, P) = \frac{W_W \cdot SW\_Ratio(D, P) + W_E \cdot SE\_Ratio(D, P) + W_O \cdot SO\_Ratio(D, P)}{W_W + W_E + W_O}$$

Where $W_{W/E/O}$ is the weight of each of the target types W/E/O accordingly. In a preferred embodiment, the following approximate weights may be used in the above equation.

$W_W=1$
$W_E=0.5$
$W_O=0.2$

In other embodiments, the weighting factors can be described more generally. For example, $W_W \geq W_E \geq W_O$. As suggested previously, $W_O$ can be adjusted according to traffic volume. For example, $W_O$ may be corrected as $W_O = (W_O K)$, where K is a relative factor of domain traffic volume such that $K \geq 1$ represents a relatively high volume of traffic, and K represents a relatively low volume of traffic.

As mentioned above, various embodiments may include a counter being limited to a predetermined number of counts for a particular requesting set of resolvers in a predetermined period of time. For example, a "server counter" for a set of resolvers may be limited one count per 24-hour period. Embodiments may include resetting the counter after the predetermined period of time. In such embodiments, a WF may be applied to the server counter based on information about a requesting set of resolvers. The WF may be based on various criteria such as, for example, a geographical location of the requesting subnet, a network traffic level of the requesting subnet, a network traffic type, and/or an architecture of the requesting subnet.

Figure 8:
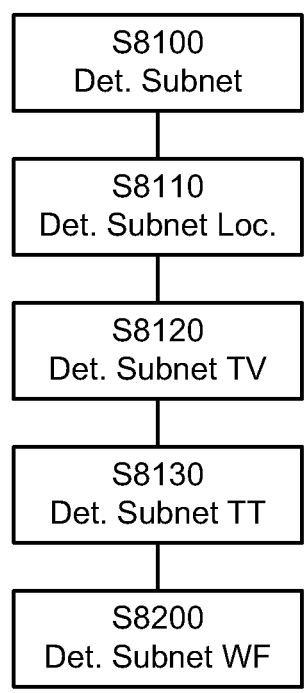
FIG. 8 depicts aspects of an exemplary method in accordance with an embodiment of the present invention.

With reference to FIG. 8, exemplary methods may include determining a set of resolvers in S8100 associated with a received request. This type of information is typically available to the authoritative server with the received request in order to provide return address information for the domain address information being requested from the authoritative server. The method may continue with S8110.

In S8110, the request may be evaluated to determine a set of resolvers location. The inventors have found that the origin location, such as the country of the resolving server, has significance in representing the number of users behind its queries. This is due to various factors, including the fact that, in some countries in which the Internet is strongly developed, there are many more resolvers per Internet user than in other, less-developed, countries. These numbers are not necessarily static and can be refined on an ongoing basis to provide even more valuable information.

In embodiments, a number of users per set of resolvers may be used as a basis for the weight factor (WF) determined for the set of resolvers in S8200, e.g. according to the country of origin. In circumstances where these values are not well know, or subject to change, the affect of the metric may be reduced by using a non-linear function. For example, it has been determined by the inventors that a root in the $3^{rd}$ order achieves good results in balancing between the range and granularity. This scale has been found to produce a max/min ratio of about 10. Information about a given country, the set of resolvers and users within the country, and/or overall countries of interest may be advantageously combined. For example, in embodiments, combinations of the geographic information above may be used in calculating the domain traffic such as by the following formula:

$$Weight_c = \sqrt[3]{\frac{InternetUsers_c}{Subnets_c - SmallSubnets_c}}$$

$$Score(d) = \frac{1}{n}\left(\frac{\sum_{c \in C} W_c(d) \cdot Weight_c}{\sum_{c \in C} UniqueW_c \cdot Weight_c} + \frac{m_e \cdot \sum_{c \in C} E_c(d) \cdot Weight_c}{\sum_{c \in C} UniqueE_c \cdot Weight_c} + \frac{m_o \cdot \sum_{c \in C} O_c(d) \cdot Weight_c}{\sum_{c \in C} UniqueO_c \cdot Weight_c}\right)$$

d—domain
C—countries of interset
$W/E/O_c$— W/E/O subnets from country c referring to domain d
$Weight_c$—the weight of country c
$UniqueW/E/O_c$—unique W/E/O subnets from country c
$n/m_e/m_o$—heuristic based variables By using such formulas in calculating a domain score, the inventors have found that a more accurate estimation of traffic volume may be achieved, particularly with domains that are more heavily frequented by non-U.S. users. That is, by separately weighting a set of resolvers according to geographic region, a more accurate representation of the global popularity of a domain may be achieved. Additionally, in terms of advertising and value of a domain to a given customer, it may be advantageous to refine the popularity calculation to weight certain geographically based traffic more or less. For example, advertisers for a certain product or service may be interested in the relative popularity of a domain within a geographic region, or common culture, language, and the like. In those instances, embodiments of the present subject matter provide mechanisms for calculating scores that reflect the traffic that is significant to the customer, such as by adjusting the weighting factors for certain countries/regions of interest above those countries/regions that are less significant to the customer. Such methods may include receiving a criteria from a customer, such as, for example, a geographic region, calculating the scores and/or ranks for a domain based on the user-defined criteria, and reporting the results of the modified scoring to the customer. The above factors provide improved flexibility in scoring domains depending on the intended audience, e.g. a global or localized audience. Thus, aspects of the present subject matter may capitalize on the set of resolvers information received by authoritative name servers in conjunction with customer-specific information to improve and refine the scoring for domain traffic.

As shown in FIG. 8, as part of determining a subnet WF, embodiments may include determining a set of resolvers traffic volume (TV) in S8120. It has been found that the traffic volumes for various sets of resolvers may vary greatly across the internet, and that the traffic volume, such as the number of queries issued by the set of resolvers in a given time, can be used to estimate a WF for the set of resolvers. For example, it has been found that about 40% of the resolver IP addresses generate 10 DNS queries a day or less. This low-level TV may be used to infer a corresponding low number of users, compared to resolvers that generate a higher volume of queries per day. That is, a set of resolvers with a low number of overall queries per day may represent a low number of users, with lower level overall traffic at the resolver level, that may be assumed for purposes of weighting the relative significance of the requests received at the authoritative server.

Additionally, there are changing numbers and percentages of DNS resolvers that refer to a very small number of domains per day (i.e. small set of resolvers). The inventors have found it useful, in certain embodiments, to weight counters for set of resolvers that issue queries for a very small number of domains differently than a set of resolvers that issue queries for a large number of domains per day, e.g. a set of resolvers that refer to millions of domains per day. This type of sets of resolvers characteristic may be determined, for example, in S8130 as a traffic type (TT) determination. Traffic type may include other aspects of the traffic generated by a set of resolvers that may be useful in inferring the presence of user generated traffic versus machine generated traffic, which, as discussed herein, can be advantageously used in calculating the score and rank of a domain for the purposes of advertising, and the like, that are concerned with user generated traffic. Aspects of the present subject matter may capitalize on the information received by authoritative name servers in conjunction with metrics regarding requesting set of resolvers to improve and refine the scoring for domain traffic. The method may continue with S8200, where an appropriate Subnet WF may be calculated based on the results of the foregoing steps.

As indicated above, content-based scoring can be based on various methodologies. A further example of a content-based scoring may include determining a purpose of the domain and applying a weighting factor to the domain rank/score calculation based on the determined purpose. For example, a status of a web site associated with the domain may first be determined, such as by attempting to access the web site. If the web site is responsive, but results in a redirect, a purpose of "redirect" may be assigned, reflecting that the site does not have active content. The score of such sites may be reduced or fined according to this purpose. If the web site is responsive and does not redirect to another site, content from the web site may be accessed to further determine the purpose of the web site. Exemplary techniques for determining the purpose of the web site may include accessing other web sites via links in the web page, and analyzing content of the web site and/or content of linked pages by a signature marker set to recognize significant data, files, code and the like. In the case of extracting content from linked pages, embodiments may include prioritizing a set of linked pages, such as by identifying significant strings in the hyperlink domain name, and accessing only a subset of the linked pages based on prioritization. Thus, a purpose of the domain may be determined based on a status of the first page, status of linked pages, and any results of contextual matching. Domain purpose can relate to theme, or intended use of the content associated with the domain, and may reflect an apparent reason for which a domain is used. Such indications can be advantageously used in the scoring of the domain, for example by calculating appropriate weighting factors based on the apparent purpose. In embodiments, purposes such as blocked, parked, under construction, redirected and the like may have fines applied to their traffic or may have the traffic scores zeroed out. Other purposes such as corporate, blog, news, social networking, and e-commerce may have higher weighting factors applied to one or more counters based on the likelihood of user-driven traffic.

Embodiments may also include determining a frequency at which information of the domain is updated and applying a weighting factor to the calculation based on the determined frequency. This may be done, for example, by comparing "snapshots", hashes, etc. of historical web site content to current content to detect changes in the content. Web sites with more frequent changes may be weighted more heavily than web sites that are updated infrequently or not at all. In the case of static sites that contain errors such as broken links etc., the content-based score may be downgraded to reflect a lower value of the domain.

The inventors have also recognized that grouping similar scores can improve the utility of the information to various users. For example, a useful representation of groups may be created by dividing the log of the scores to 100 equal width bins where 1 is the lowest and 100 in the highest.

In embodiments, advertising pricing can be determined based on the group for a domain. For example, a domain in a traffic group between 90-100 may have a different advertising rate applied to it as opposed to a domain in a traffic group between 50-60. It should be noted that these groups are not limited to raw traffic score data and represent a more meaningful and valuable metric based on the methodologies described herein, as well as the broad perspective gained from the level of the TLD server. For example, the inventors have observed that the methodologies discussed herein may identify web sites and domains that are developing traffic at a lower level and in advance of conventional methods. Such results can be obtained, in part, based on the ability of the TLD to aggregate, and evaluate the significance of, traffic from across the Internet.

Figure 9:
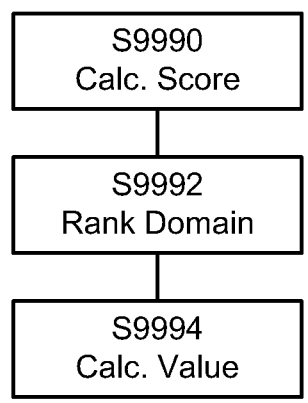
FIG. 9 depicts aspects of an exemplary method in accordance with an embodiment of the present invention.

With reference to FIG. 9, embodiments may include taking a calculated score, such as in S3990, S6900, and/or S7900, and using that score to rank the domain. For example, a calculated traffic score for a domain may be compared against other calculated scores in S9992 in order to rank the domain among other domains on the web. Such rankings can be used in a more intuitive way for users to evaluate an appropriate pricing or value for advertising on a particular domain. The calculated ranks may be distributed as part of a pay service, or used for other purposes including system management, etc. Domain rankings can also be used in the context of commercial services, such as advertising, to calculate a value in S9994. For example, the value of advertising on a particular domain may be linked to a rank-based equation that provides automated online advertising rates. Such systems can be used to evaluate and reward web site developers that are beginning to see significant traffic, in ways that are not possible using current methods. For example, a TLD server, or other vendor with access to the disclosed information, can automatically provide offers from potential advertisers to domains that meet a particular ranking. As indicated above, the inventors have found that it is possible to identify previously unrecognized low-level traffic sites, that may be of interest to potential advertisers, when viewed from the position of the authoritative server, particularly the TLD server.

Figure 10:
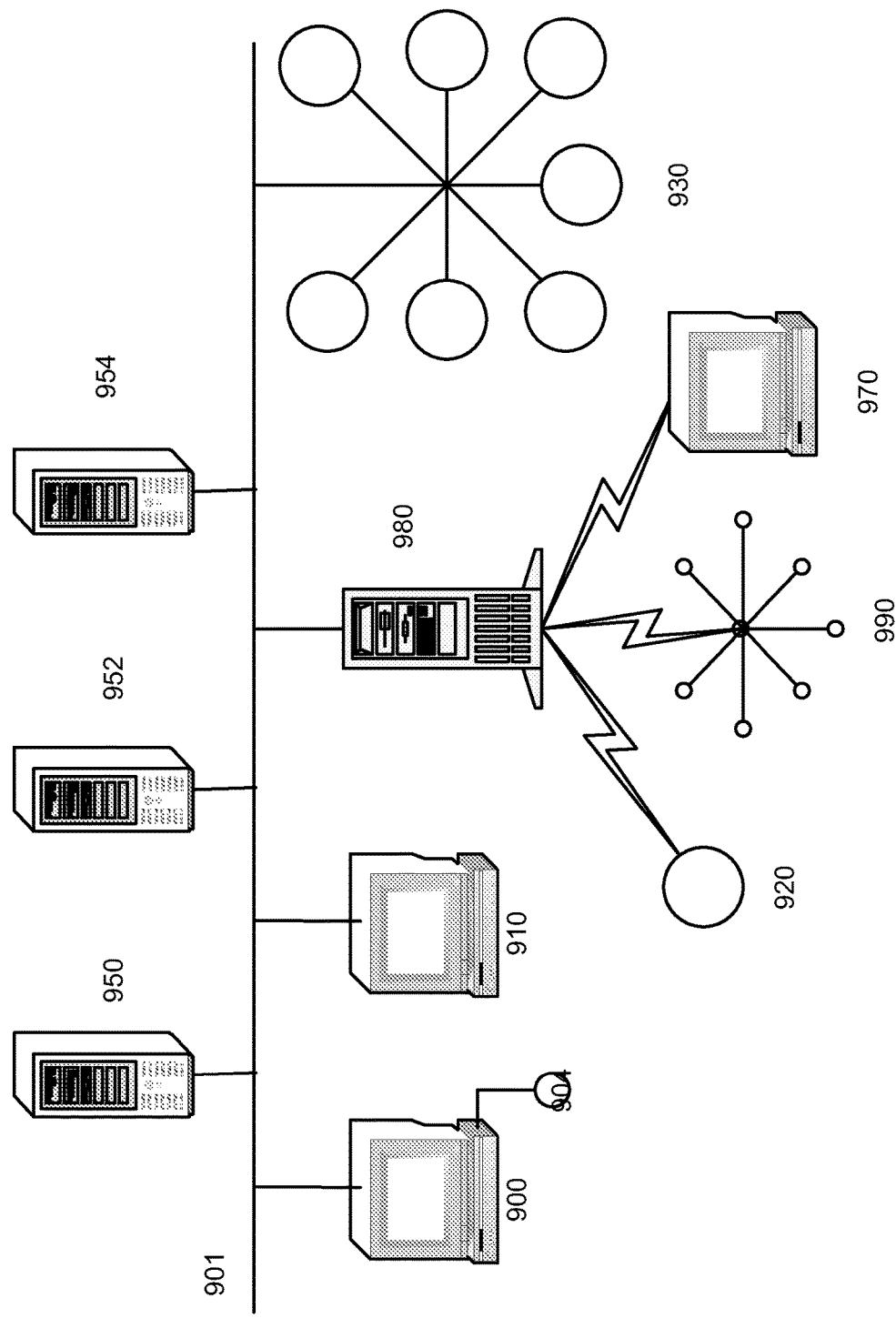
FIG. 10 depicts an exemplary system and related network in accordance with an embodiment of the present invention.

Embodiments of the present invention can include systems for implementing the described methods, as well as computer-readable storage medium coded with instructions for causing a computer to execute the described methods. For example, as shown in FIG. 10, an electronic system 900 including a processor, a memory and an electronic communication device may be configured to request DNS information via ISP server 950. The system 900 may be represent a user computer system, wireless communication devices such as 920, 970, subnetworks such as 930, 990, a server, or any other network-capable device with the requisite functional capabilities. Servers 952, 954 may operate as part of, or separate from, a DNS server associated with a registry.

The system 900 includes any number of processors (not shown) that are coupled to storage devices including a first storage (not shown, typically a random access memory, or "RAM"), second storage (not shown, typically a read only memory, or "ROM"). Both of these storage devices may include any suitable type of the computer-readable media described and/or mentioned above. A mass storage device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

The system 900 may also include an interface that includes one or more input/output devices such as such as video monitors, track balls, mice 904, keyboards, microphones, touch-sensitive displays, transducer card readers, magnetic or paper tape readers, tablets, styluses, voice or handwriting recognizers, or other known input devices, including other computers 910. The system 900 may be coupled to a computer or other electronic communication network 990, 980 using a network connection as shown generally at 901. The network can connect various wired, optical, electronic and other known networks to exchange information among computers 910, servers 950, 952, 954, wireless communication devices 920, 970 and sub-networks 990, 930. With such a network connection, it is contemplated that the system 900 and the processor therein may receive information from the network, or may output information to the network in the course of performing the above-described method steps. The above-described devices and materials will be familiar to those of skill in the computer hardware and software arts and need not be individually or exhaustively depicted to be understood by those of skill in the art. The hardware elements described above may be configured (usually temporarily) to act as one or more modules for performing the operations described above.

In addition, embodiments of the present invention further include computer-readable storage media that include program instructions for performing various computer-implemented operations. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The invention has been described with reference to exemplary embodiments. Modifications and alterations of the described embodiments may be evident to those of ordinary skill in the art upon a reading and understanding of this specification. The present invention is intended to include all such modifications and alterations insofar as they come within the scope of the appended claims, or the equivalents thereof.

What is claimed is:

1. A method for scoring a domain, comprising:
 receiving requests to resolve the domain at a domain resolution server, wherein each request to resolve the domain comprises one of a plurality of domain name strings that map to the domain;
 determining a specified domain name string format for the domain, wherein the specified domain name string format comprises a domain name string format that does not include a "www" string;
 determining that one or more of the plurality of domain names strings match the specified domain name string format of a plurality of domain name string formats for the domain;
 maintaining separate counters for each of the plurality of domain name string formats for the domain;
 automatically incrementing a first counter for each of the one or more of the plurality of domain names strings that match the specified domain name string format, wherein a second counter associated with a second domain name string format is a counter associated with domain name strings that include a "www" string;
 obtaining information from a web page associated with the domain; and
 automatically calculating a score for the domain by a computer processor based upon the first counter and the information from the web page associated with the domain.

2. The method of claim 1, wherein the obtaining the information from the web page associated with the domain comprises:
 obtaining link information from the web page; and
 analyzing status information of network links corresponding to the link information.

3. The method of claim 2, wherein the analyzing the status information of the network links corresponding to the link information comprises searching for at least one of domain redirections, domain errors, mirror content, or commonly linked sites.

4. The method of claim 1, further comprising obtaining information from another web page that is linked to the domain.

5. The method of claim 1, further comprising:
 analyzing characters of the one or more of the plurality of domain name strings; and
 applying a weighting factor to the calculating the score for the domain based on the analyzing the characters of the one or more of the plurality of domain name strings.

6. The method of claim 1, wherein the calculating the score for the domain includes applying a quality factor based on a relationship between total links of the domain and responsive links of the domain.

7. The method of claim 1, further comprising:
 determining a purpose of the domain; and
 applying a weighting factor to the calculating the score for the domain based on the purpose that is determined.

8. The method of claim 1, further comprising:
 determining a frequency at which information associated with the domain is updated; and
 applying a weighting factor to the calculating the score for the domain based on the frequency that is determined.

9. The method of claim 1, further comprising:
 comparing a first number of domain name strings counted by the first counter to a second number of domain name strings counted by the second counter; and
 applying a weighting factor to a traffic score of at least one of the first counter or the second counter based on the comparison.

10. The method of claim 1, further comprising:
 determining a number of external links to subdomains of the domain; and
 applying a weighting factor to a traffic score of at least one of the separate counters based on the number of external links to the subdomains.

11. A method for scoring a domain, comprising:
 receiving requests to resolve the domain at a domain resolution server, wherein each request to resolve the domain comprises one of a plurality of domain name strings that map to the domain;
 determining a specified domain name string format of a plurality of domain name string formats for the domain, wherein the specified domain name string format comprises a domain name string format that does not include a "www" string;
 determining that one or more of the plurality of domain names strings do not match the specified domain name string format comprise a "www" string;
 maintaining separate counters for each of the plurality of domain name string formats for the domain;
 automatically incrementing a first counter for each of the one or more of the plurality of domain names strings that do not match the specified domain name string format and do not comprise a "www" string, wherein a second counter associated with a second domain name string format is a counter associated with domain name strings that include a "www" string;
 obtaining information from a web page associated with the domain; and
 automatically calculating a score for the domain by a computer processor based upon the first counter and the information from the web page associated with the domain.

12. The method of claim 11, wherein the obtaining the information from the web page associated with the domain comprises:
 obtaining link information from the web page; and
 analyzing status information of network links corresponding to the link information.

13. The method of claim 12, wherein the analyzing the status information of the network links corresponding to the link information comprises searching for at least one of domain redirections, domain errors, mirror content, or commonly linked sites.

14. The method of claim 11, further comprising obtaining information from another web page that is linked to the domain.

15. The method of claim 11, further comprising:
analyzing characters of the one or more of the plurality of domain name strings; and
applying a weighting factor to the calculating the score for the domain based on the analyzing the characters of the one or more of the plurality of domain name strings.

16. The method of claim 11, wherein the calculating the score for the domain includes applying a quality factor based on a relationship between total links of the domain and responsive links of the domain.

17. The method of claim 11, further comprising:
determining a purpose of the domain; and
applying a weighting factor to the calculating the score for the domain based on the purpose that is determined.

18. The method of claim 11, further comprising:
determining a frequency at which information associated with the domain is updated; and
applying a weighting factor to the calculating the score for the domain based on the frequency that is determined.

19. The method of claim 11, further comprising:
comparing a first number of domain name strings counted by the first counter to a second number of domain name strings counted by the second counter; and
applying a weighting factor to a traffic score of at least one of the first counter or the second counter based on the comparison.

20. The method of claim 11, further comprising:
determining a number of external links to subdomains of the domain; and
applying a weighting factor to a traffic score of at least one of the separate counters based on the number of external links to the subdomains.

* * * * *